US010328662B2

(12) United States Patent
Roberts

(10) Patent No.: US 10,328,662 B2
(45) Date of Patent: Jun. 25, 2019

(54) IN-SITU FOAM CORE STRESS MITIGATION COMPONENT AND METHOD OF MANUFACTURE

(71) Applicant: Richard W. Roberts, Tecumseh, MI (US)

(72) Inventor: Richard W. Roberts, Tecumseh, MI (US)

(*) Notice: Subject to any disclaimer, the term of this patent is extended or adjusted under 35 U.S.C. 154(b) by 430 days.

(21) Appl. No.: 14/069,422

(22) Filed: Nov. 1, 2013

(65) Prior Publication Data
US 2014/0120307 A1 May 1, 2014

Related U.S. Application Data

(60) Provisional application No. 61/721,070, filed on Nov. 1, 2012.

(51) Int. Cl.
B32B 3/24 (2006.01)
B32B 3/26 (2006.01)
B32B 5/18 (2006.01)
B32B 5/20 (2006.01)
B32B 7/08 (2019.01)
B32B 25/16 (2006.01)
(Continued)

(52) U.S. Cl.
CPC .............. *B32B 3/266* (2013.01); *B32B 3/28* (2013.01); *B32B 5/18* (2013.01); *B32B 5/20* (2013.01); *B32B 7/05* (2019.01); *B32B 7/08* (2013.01); *B32B 25/16* (2013.01); *B32B 27/065* (2013.01); *B32B 27/302* (2013.01); *B32B 27/308* (2013.01); *B32B 27/32* (2013.01); *B60N 2/686* (2013.01); *B32B 2266/025* (2013.01); *B32B 2270/00* (2013.01); *B32B 2307/738* (2013.01); *Y10T 428/24281* (2015.01)

(58) Field of Classification Search
CPC ...................................... B32B 3/266
See application file for complete search history.

(56) References Cited

U.S. PATENT DOCUMENTS 776,342 A 11/1904 McCormick
1,588,778 A 6/1926 Sorensen
(Continued)

FOREIGN PATENT DOCUMENTS

EP 0542302 5/1993
EP 0535147 9/1996
(Continued)

OTHER PUBLICATIONS

Website, Specter, www.mmh.com Sep. 2009, "Modern Materials Handling, The Rise of the Plastic Pallet." 4 Pages.
(Continued)

*Primary Examiner* — William P Watkins, III
(74) *Attorney, Agent, or Firm* — Brooks Kushman P.C.

(57) ABSTRACT

An in-situ foam core component having first and second opposed thermoformed skins each having a thermal bond to an in-situ foam core disposed there between. At least one embossment In one of the skins joined to the other skin forming a pinch off junction. A through hole is formed in the pinch off junction sized to receive a fastener so that the embossment provides a sleeve structure which can transmit load between the first and second skins when the in-situ foam core component is attached to a member using a fastener extending through the hole.

17 Claims, 4 Drawing Sheets

(51) Int. Cl.
*B32B 27/06* (2006.01)
*B32B 27/30* (2006.01)
*B32B 27/32* (2006.01)
*B32B 3/28* (2006.01)
*B60N 2/68* (2006.01)
*B32B 7/05* (2019.01)

(56) References Cited

U.S. PATENT DOCUMENTS

| | | |
|---|---|---|
| 2,784,417 A | 3/1957 | Strand |
| 2,983,963 A | 5/1961 | Jodell et al. |
| 3,062,337 A | 11/1962 | Zittle |
| 3,111,787 A | 11/1963 | Chamberlain |
| 3,132,417 A | 5/1964 | Irwin |
| 3,277,220 A | 10/1966 | Plymale et al. |
| 3,389,195 A | 6/1968 | Gianakos et al. |
| 3,400,429 A | 9/1968 | Ludwig |
| 3,466,700 A | 9/1969 | Harrison |
| 3,468,097 A | 9/1969 | Mack |
| 3,563,845 A | 2/1971 | Stevens |
| 3,598,312 A | 8/1971 | Hamilton |
| 3,745,998 A | 7/1973 | Rose |
| 3,774,968 A | 11/1973 | Fenton |
| 3,813,040 A | 5/1974 | Heinemeyer |
| 3,935,044 A | 1/1976 | Daly |
| 4,361,656 A | 11/1982 | Mostafa |
| 4,492,663 A | 1/1985 | Reinfeld et al. |
| 4,546,899 A | 10/1985 | Williams |
| 4,573,741 A | 3/1986 | Kirchner-Carl |
| 4,621,002 A | 11/1986 | Kuhlmann et al. |
| 4,651,494 A | 3/1987 | Van Wagoner |
| 4,680,909 A | 7/1987 | Stewart |
| 4,762,438 A | 8/1988 | Dewing |
| 4,825,089 A | 4/1989 | Lindsay |
| 4,840,973 A | 6/1989 | Kuwabara et al. |
| 5,018,329 A | 5/1991 | Hasan et al. |
| 5,023,042 A | 6/1991 | Efferding |
| 5,028,377 A | 7/1991 | Hendry |
| 5,055,350 A | 10/1991 | Neefe |
| 5,093,053 A | 3/1992 | Eckardt et al. |
| 5,252,270 A | 10/1993 | Haardt et al. |
| 5,275,860 A | 1/1994 | D'Luzansky et al. |
| 5,306,266 A | 4/1994 | Freeland |
| 5,345,814 A | 9/1994 | Cur et al. |
| 5,366,674 A | 11/1994 | Hattori et al. |
| 5,437,750 A * | 8/1995 | Rinse .................. B29C 65/08 156/293 |
| 5,505,810 A | 4/1996 | Kirby et al. |
| 5,532,034 A | 7/1996 | Kirby et al. |
| 5,665,285 A | 9/1997 | Hattori et al. |
| 5,711,073 A | 1/1998 | Tippmann et al. |
| 5,713,518 A | 2/1998 | Fox et al. |
| 5,759,459 A | 6/1998 | Eckardt et al. |
| 5,786,394 A | 7/1998 | Slaven |
| 5,824,261 A | 10/1998 | Berdan |
| 5,858,159 A | 1/1999 | Holbrook et al. |
| 5,866,224 A | 2/1999 | Ang et al. |
| 5,956,905 A | 9/1999 | Weidrich |
| 6,179,215 B1 | 1/2001 | Shea |
| 6,196,760 B1 | 3/2001 | Sinclair |
| 6,230,981 B1 | 5/2001 | Hill et al. |
| 6,241,926 B1 | 6/2001 | Cutler |
| 6,375,892 B2 | 4/2002 | Thomas |
| 6,605,343 B1 | 8/2003 | Motoi et al. |
| 6,685,333 B1 | 2/2004 | Bieberdorf |
| 6,692,183 B2 | 2/2004 | Godfrey |
| 6,931,809 B1 | 8/2005 | Brown et al. |
| 6,938,968 B2 | 9/2005 | Tanimoto et al. |
| 6,955,576 B2 | 10/2005 | Yeh |
| 6,972,144 B2 | 12/2005 | Roth et al. |
| 7,201,112 B2 | 4/2007 | Jolley |
| 7,201,625 B2 | 4/2007 | Yeh |
| 7,219,479 B2 | 5/2007 | Durning et al. |
| 7,358,280 B2 | 4/2008 | Berghmans et al. |
| 7,377,828 B2 | 5/2008 | Cheung |
| 7,401,998 B2 | 7/2008 | Wilson et al. |
| 7,485,352 B2 | 2/2009 | Yuasa et al. |
| 7,537,413 B1 | 5/2009 | Brugos |
| 7,931,210 B1 | 4/2011 | Pike et al. |
| 7,950,592 B2 | 5/2011 | Yuan |
| 7,976,749 B2 | 7/2011 | Volkel et al. |
| 2002/0124531 A1 | 9/2002 | Mossbeck et al. |
| 2003/0081999 A1 | 5/2003 | Godfrey |
| 2003/0181536 A1 | 9/2003 | Roth |
| 2003/0224675 A1 | 12/2003 | Yeh |
| 2004/0172964 A1 | 9/2004 | Brachert et al. |
| 2004/0176001 A1 | 9/2004 | Yeh |
| 2004/0232254 A1 | 11/2004 | Kowalski |
| 2005/0001048 A1 | 1/2005 | Skoblenick et al. |
| 2005/0101201 A1 | 5/2005 | Yeh |
| 2005/0188637 A1 | 9/2005 | Yeh |
| 2005/0215138 A1 | 9/2005 | Yeh |
| 2005/0272323 A1 | 12/2005 | Yeh |
| 2006/0003044 A1 | 1/2006 | Dinello et al. |
| 2006/0030467 A1 | 2/2006 | Mellott |
| 2006/0078382 A1 | 4/2006 | Wilson et al. |
| 2006/0105650 A1 | 5/2006 | Yeh |
| 2006/0110993 A1 | 5/2006 | Yeh |
| 2006/0131437 A1 | 6/2006 | Thiagarajan et al. |
| 2006/0134401 A1 | 6/2006 | Yeh |
| 2006/0223897 A1 | 10/2006 | Sasaki |
| 2007/0015421 A1 | 1/2007 | Yeh |
| 2007/0040293 A1 | 2/2007 | Lane et al. |
| 2007/0160798 A1 | 7/2007 | Yeh |
| 2008/0081153 A1 | 4/2008 | Yeh |
| 2008/0083835 A1 | 4/2008 | Girardi et al. |
| 2008/0125502 A1 | 5/2008 | Reichman et al. |
| 2008/0142611 A1 | 6/2008 | Scobie |
| 2008/0166539 A1 | 7/2008 | Yeh |
| 2008/0242169 A1 | 10/2008 | Yeh |
| 2008/0305304 A1 | 12/2008 | Yeh |
| 2009/0011667 A1 | 1/2009 | Hayward et al. |
| 2009/0100780 A1 | 4/2009 | Mathis et al. |
| 2009/0133354 A1 * | 5/2009 | Spear .................. E04B 2/7453 52/588.1 |
| 2010/0028654 A1 | 2/2010 | Takase et al. |
| 2010/0116180 A1 | 5/2010 | Roth et al. |
| 2011/0115120 A1 | 5/2011 | Hattori et al. |
| 2011/0180959 A1 * | 7/2011 | Donnelly .............. B29C 66/436 264/241 |
| 2012/0031912 A1 | 2/2012 | Wang |
| 2012/0102884 A1 | 5/2012 | Roberts, Jr. |
| 2012/0104110 A1 | 5/2012 | Roberts, Jr. |
| 2012/0240451 A1 | 9/2012 | Ricks |
| 2012/0328889 A1 | 12/2012 | Hayashi et al. |
| 2013/0140860 A1 | 6/2013 | Naughton et al. |

FOREIGN PATENT DOCUMENTS

| | | |
|---|---|---|
| JP | 58213028 | 12/1983 |
| JP | S59145125 | 8/1984 |
| JP | 59155443 | 9/1984 |
| JP | 59210954 | 11/1984 |
| JP | 60090744 | 5/1985 |
| JP | 06166112 | 6/1994 |
| JP | 07195536 | 8/1995 |
| WO | 9119867 | 12/1991 |
| WO | 2011103284 | 8/2011 |

OTHER PUBLICATIONS

Website www.jsp.com, 2006, "Arplank, Expanded bead foam packaging materials, Material Properties, Auto/Mil Specs." 21 Pages.
Website, Manning, www.mmh.com Oct. 2008, Retrived on Jan. 4, 2011, "Modern Materials Handling, Choosing Plastic." 2 Pages.
Vehicle Certification Agency Oct. 25, 2007, pp. 1-6, Test Report No. ESH178571, "Test Report: Seat Strength."
ECE Agreement Jul. 31, 2002, Regulation No. 17, "Concerning the adoption of uniform technical prescriptions for wheeled vehicles, equipment and parts which can be fitted and / or used on wheeled vehicles and the conditions for reciprocal recognition of approvals granted on the basis of these prescriptions."

(56) References Cited

OTHER PUBLICATIONS

GB Examination Report for GB 1308511.3, Completed by the GB Patent Office, dated Aug. 10, 2016, 5 Pages.

* cited by examiner

IN-SITU FOAM CORE STRESS MITIGATION COMPONENT AND METHOD OF MANUFACTURE

CROSS-REFERENCE TO RELATED APPLICATIONS

This application claims the benefit of U.S. provisional application Ser. No. 61/721,070 filed Nov. 1, 2012, the disclosure of which is hereby incorporated in its entirety by reference.

TECHNICAL FIELD

The disclosed embodiments relate to an in-situ foam core stress mitigation component and method of manufacturing of same.

BACKGROUND

Vehicle manufacturers attempt to reduce the weight of the vehicles in order to enhance the fuel economy of the vehicle. Often the reduction in weight compromises the strength of component parts. Recently, regulations, such as ECE17 and Federal Motor Vehicle Safety Standards (FMVSS), such as FMVSS202A, have mandated a stiffer component structure for vehicle seats.

Recent components, meeting ECE17 regulation, such as seat frames comprising a plastic blend of polycarbonate and acrylonitrile butadiene styrene (PC/ABS), have increased the cost of seat frames as well as increased the weight of the seat frames relative to the blowmolded polyethylene seat frames that they replaced.

Manufacturers need to connect seat frame components, including the PC/ABS seat frames, to fixed platforms in the vehicles. Current methods, such as bolting directly through a plastic component, result in areas of very high stress concentration. Very high stress concentration may result in premature fatigue failure of the plastic component or other structural damage to the plastic component during high acceleration and deceleration events of the vehicle.

What is needed is a lightweight component that mitigates the stress concentration while remaining economically competitive.

DETAILED DESCRIPTION

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "co-polymer," "ter-polymer," "pre-polymer," and the like.

It is also to be understood that the invention is not limited to specific embodiments and methods described below, as specific composite components and/or conditions to make, of course, vary. Furthermore, the terminology used herein is used only for the purpose of describing particular embodiments of the present invention and is not intended to be limiting in any way.

It must also be noted that, as used in the specification and the pending claims, the singular form "a," "an," and "the" comprise plural reference unless the context clearly indicates otherwise. For example, the reference to a component in the singular is intended to comprise a plurality of components.

Figure 1:
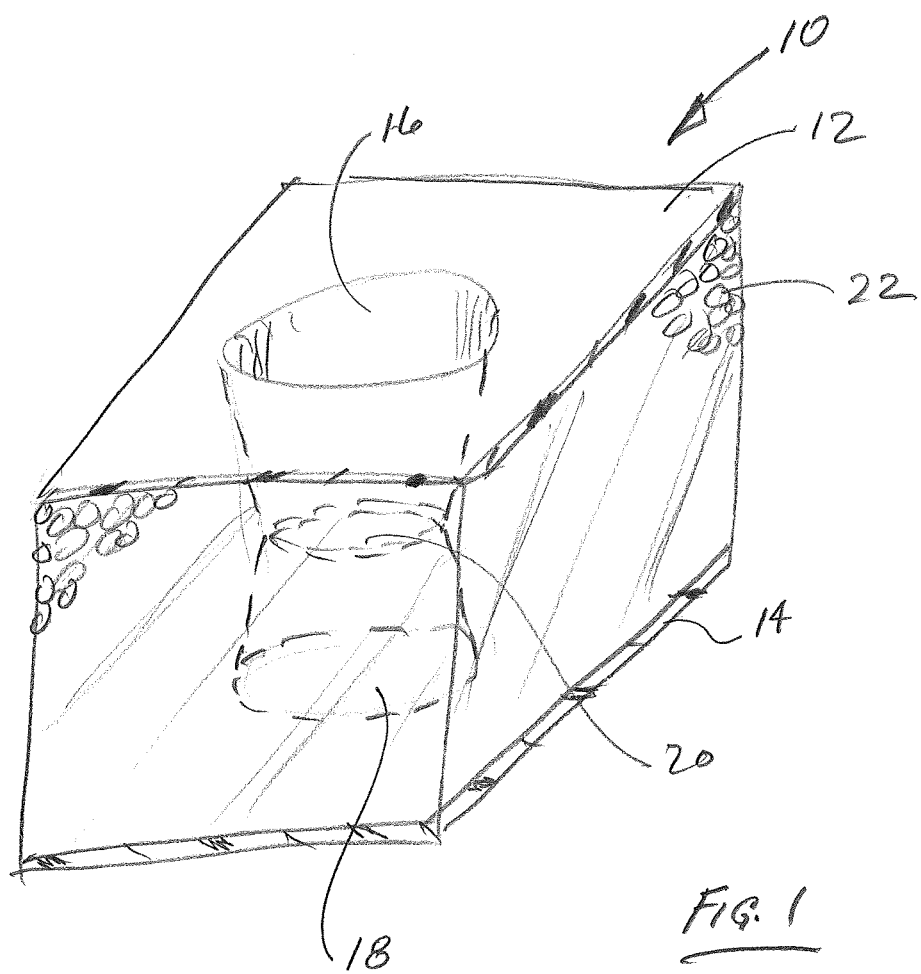
FIG. 1 schematically illustrates a stress mitigation component according to at least one embodiment.

FIG. 1 schematically illustrates a stress mitigation component 10 according to at least one embodiment. Stress mitigation component 10 includes a first skin 12 and a second skin 14 opposed to and separated from first skin 12. First skin 12 may be continuously connected to second skin 14 in certain embodiments, such as in a blow molded part. In another embodiment, first skin 12 may be spaced apart from second skin 14 at essentially all points. Situated between first skin 12 and second skin 14 is an in-situ foam core 22. In the illustrated embodiments, an embossment 16 is formed into first skin 12 either before or after the in-situ foam core 22 is formed. Embossment 16 includes a portion of first skin 12 drawn into a cupped shaped depression. Embossment 18 is formed into second skin 14 either before or after the in-situ foam core 22 is formed. Where embossment 16 and 18 meet a pinch off junction 20 is formed. Junction 20, in at least one embodiment, is sufficiently thin that a man hole may be formed by removed by applying relatively low mechanical force, such as a cutting device 38, or by manual pushing of an instrument, such as a fastener through the junction.

Figure 2A:
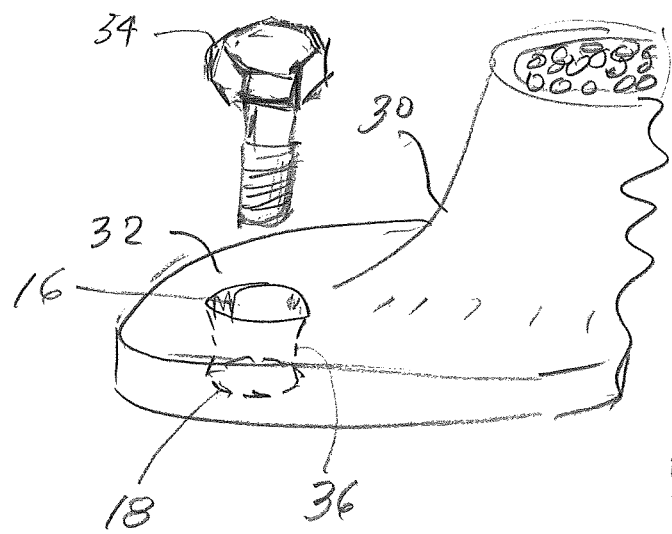
FIG. 2A schematically illustrates a stress mitigation component in use with a seat frame base according to at least one embodiment.
Figure 2B:
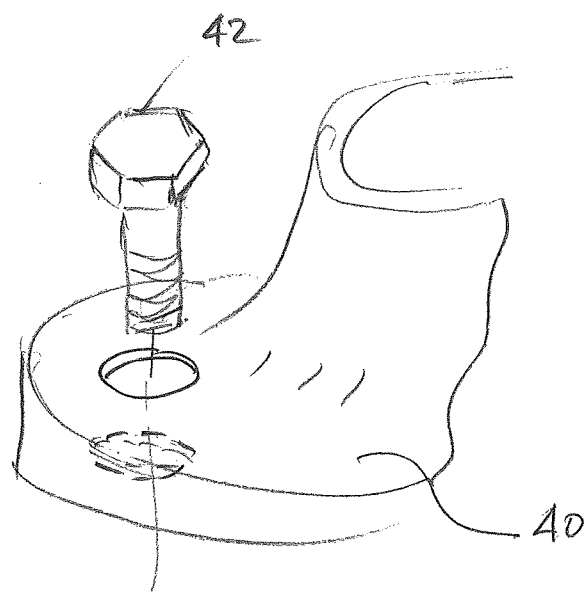
FIG. 2B schematically illustrates a seat frame base from prior art.

FIG. 2A schematically illustrates a fragmentary isometric view of a seat base frame foot 30 for use in mounting a seat base frame to a vehicle, according to at least one embodiment. Seat frame foot 30, in at least one embodiment, includes stress mitigation component 10. A portion of a blowmolded seat frame (not shown) has in-situ foam core 22 bonded to the blowmolded surfaces including those forming seat frame foot 30, such as skins 12 and 14. Seat frame foot 30 includes a base 32 into which embossments 16 and 18 are formed. Junction 20 is removed by puncturing with a fastener 34. Fastener 34 is fitted inside a collar 36 formed in embossments 16 and 18 by first and second skins 12 and 14. The stress concentration in the foot surrounding the fastener is unexpectedly reduced using collar 36 in combination with in-situ foam core 22 and the blow molded surfaces when compared to prior art configurations, such as in FIG. 2B. FIG. 2B schematically illustrates a prior art seat frame foot 40 where a fastener 42 is driven through the blow molded surface and in-situ foam core 22 without the embossments 16 and 18 defining the collar 36. The stress concentration is at least an order of magnitude greater than the embodiment illustrated in FIG. 2A. The prior art blowmolded seat frame foot 40 failed to pass ECE 17 testing. In another embodiment, the peak stress concentration is reduced by a range of 20% to 500% relative to prior art blowmolded seat frame foot 40, based on finite element analysis modeling. In another embodiment, the peak stress concentration is reduced by a range of 50% to 200% relative to prior art blowmolded seat frame foot 40.

Seat frame foot 30 having skin 12 and 14 comprising a polypropylene composition having a thickness ranging between 0.025 inches and 0.25 inches with in-situ foam core 22 density ranging from 1 lb/ft$^3$ to 5 lbs/ft$^3$ formed of expanded polypropylene (EPP) that is expanded using steam, passes ECE 17. The seat frame foot 30 is a portion of a seat frame that surprisingly reduces the weight by 5 to 15 pounds of a seat frame relative to a PC/ABS 60/40 composition equivalent.

The seat component can alternatively be a seat back with a through hole embossment formed at the hinge or seat back latch attachment point to receive mounting fasteners.

In at least one embodiment, skin 12 or 14 thickness may range from 0.02 inches to 0.5 inches. In another embodiment, skin 12 or 14 thickness may range from 0.125 inches to 0.25 inches.

In at least one embodiment, in-situ core 22 thickness may range from 0.15 inches to 6 inches. In another embodiment, in-situ foam core 22 thickness may range from 0.2 inches to 4 inches. In another embodiment, in-situ foam core 22 thickness may range from 0.5 inches to 1 inch.

Skins 12 and/or 14, in at least one embodiment, are formed of a composition of any moldable composition. Non-limiting examples of the composition include, but are not limited to, a liquid silicone rubber, a synthetic rubber, a natural rubber, a liquid crystal polymer, a synthetic polymer resin, and a natural polymer resin. In another embodiment, skins 12 and/or 14 are formed of a composition of a thermoplastic polymer, a thermoset polymer, or blends thereof having a viscosity ranging from 0.1 grams/10 min. to 40 grams/10 min. The viscosity is measured according to ASTM D-1238 at 190° C. with a 2.16 kg weight. In yet another embodiment, skins 12 and/or 14 are formed of a composition of a polyolefin including a polypropylene and polyethylene having a viscosity ranging from 1 grams/10 min. to 30 grams/10 min. In yet another embodiment, skins 12 and/or 14 are formed of a composition of a vinyl-containing composition, including polystyrene and acrylonitrile-butadiene-styrene (ABS).

In-situ foam core 22, in at least one embodiment, is formed of a composition of any fluid-expandable material. Examples of fluid-expandable material include, but are not limited to, a polyolefin polymer composition, a biopolymer expandable bead, an alkenyl aromatic polymer or copolymer, a vinyl aromatic polymer resin composition, and a polystyrene polymer composition. In at least one embodiment, the polyolefin polymer composition includes polyolefin homopolymers, such as low-density, medium-density, and high-density polyethylenes, isotactic polypropylene, and polybutylene, and copolymers of ethylene or polypropylene with other polymerized bull monomers such as ethylene-propylene copolymer, and ethylene-vinyl acetate copolymer, and ethylene-acrylic acid copolymer, and ethylene-ethyl acrylate copolymer, polystyrene, and ethylene-vinyl chloride copolymer. These polyolefin resins may be used alone or in combination. Preferably, expanded polypropylene (EPP) particles, cross-linked expanded polyethylene (xEPE) particles, polyphenyloxide (PPO) particles, biomaterial particles, such as polyactic acid (PLA), and polystyrene particles are used. In at least one embodiment, the polyolefin polymer is a homopolymer providing increased strength relative to a copolymer. It is also understood that some of the particles may be unexpanded, also known as pre-puff, partially and/or wholly pre-expanded without exceeding the scope or spirit of the contemplated embodiments.

Pre-expanded beads, in at least one embodiment, are the resultant bead after raw bead has undergone a first expansion step of a two-step expansion process for beads. During the first expansion step, raw bead is expanded to 2% to 95% of the fully expanded bead size. The fully expanded bead is the bead that forms in-situ foam core 22. In another embodiment, pre-expanded bead is the result of the first expansion step where raw bead is expanded from 25% to 90% of the fully-expanded bead size.

A fluid for the second expansion step of the two-step expansion process for beads causes the pre-expanded beads to expand completely to form the fully expanded beads. Examples of the fluid include, but are not limited to, steam and superheated steam. In certain embodiments, after expansion with the heated fluid, the beads in contact with the skins 12 and 14 are bonded to the skin forming a thermal bond with in-situ foam core 22 therebetween.

Polyolefin beads and methods of manufacture of pre-expanded polyolefin beads suitable for making the illustrated embodiments are described in Japanese Patent Nos. JP60090744, JP59210954, JP59155443, JP58213028, and U.S. Pat. No. 4,840,973. Non-limiting examples of expanded polyolefins are ARPLANK®, and ARPRO®, available from JSP, Inc. (Madison Heights, Mich.). The expanded polypropylene, such as JSP ARPRO™ EPP, has no external wall.

In at least one embodiment, in-situ foam core 22 density, after expansion by steam, ranges from 1 lb/ft$^3$ to 25 lbs/ft$^3$. In at least one embodiment, in-situ foam core 22 density ranges from 1.5 lbs/ft$^3$ to 15 lbs/ft$^3$. In at least one embodiment, in-situ foam core 22 density ranges from 2 lbs/ft$^3$ to 9 lbs/ft$^3$. In at least one embodiment, in-situ foam core 22 density ranges from 3 lbs/ft$^3$ to 6 lbs/ft$^3$.

In at least one embodiment, skins 12 and/or 14, with a range of 0.025 inch thickness to 0.1 inch thickness, are comprised of metallocene polypropylene. Such a combination is found to improve adhesion between skins 12 and/or 14 and in-situ foam core from 22 formed of EPP.

Figure 3A:
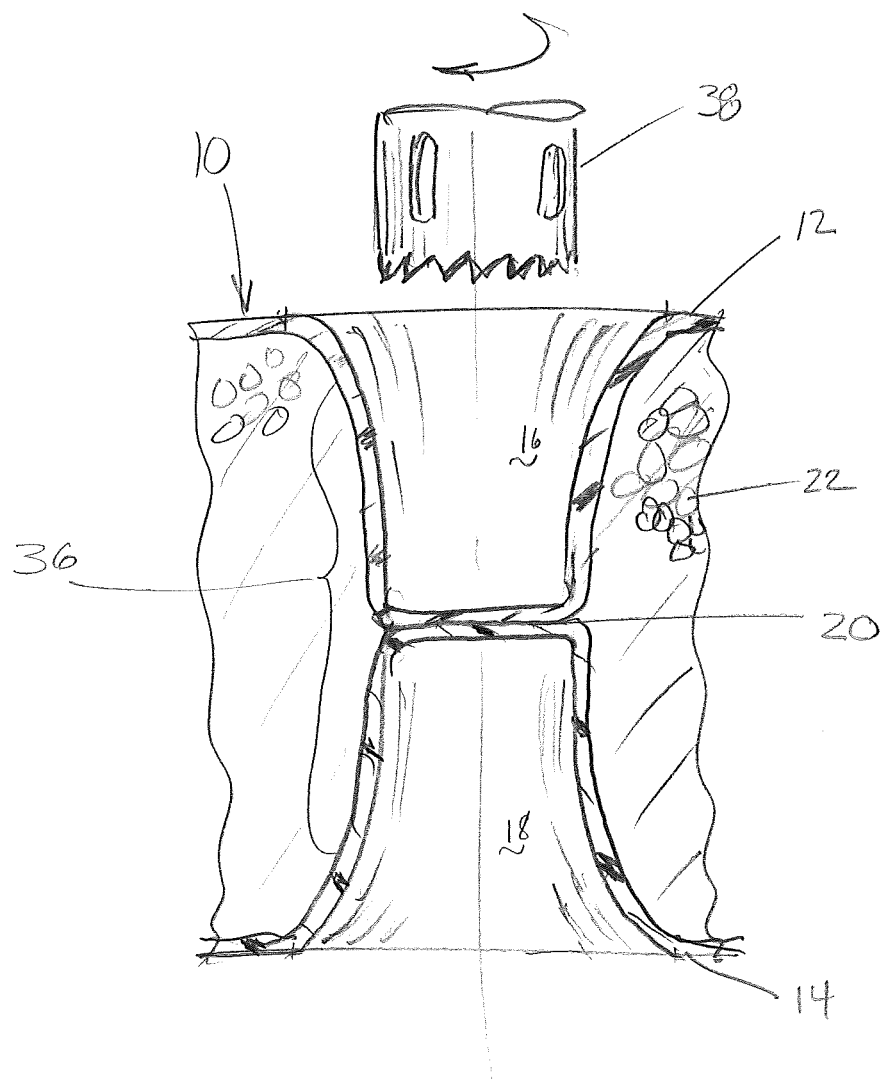
FIG. 3A schematically illustrates in a fragmentary cross-sectional view a stress mitigation component according to at least one embodiment.

Turning now to FIG. 3A, stress mitigation component 10 is schematically illustrated in a fragmentary cross-sectional view according to at least one embodiment. Embossment 16 that draws skin 12 approximately half the way through stress mitigation component 10 meets embossment 18 that draws skin 14 to meet embossment skin 12 forms junction 20. The combination of embossments 16 and 18 forms collar 36. Junction 20, in at least one embodiment is cut out with cutting device 38. Preferably the embossments are circular in cross section and outwardly taper from the periphery of the junction to the skin surface at an angle of Θ, 1 to 5 degrees to provide die draft.

Figure 3B:
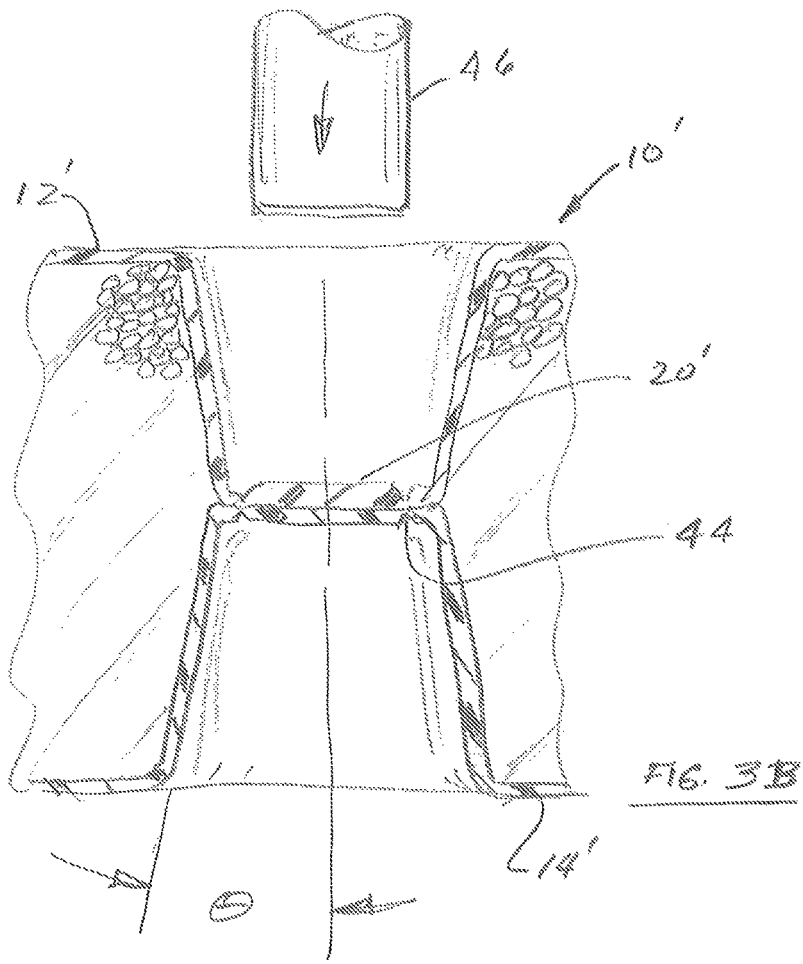
FIG. 3B schematically illustrates in a fragmentary cross-sectional view of an alternative stress mitigation component embodiment.

FIG. 3B is a variation 10' of the stress mitigation component 10 of FIG. 3A with junction 20' provided with an annular frangible zone 44 to facilitate knocking out central section of junction 20' with a punch 46 or fastener to form a through hole.

Figure 3C:
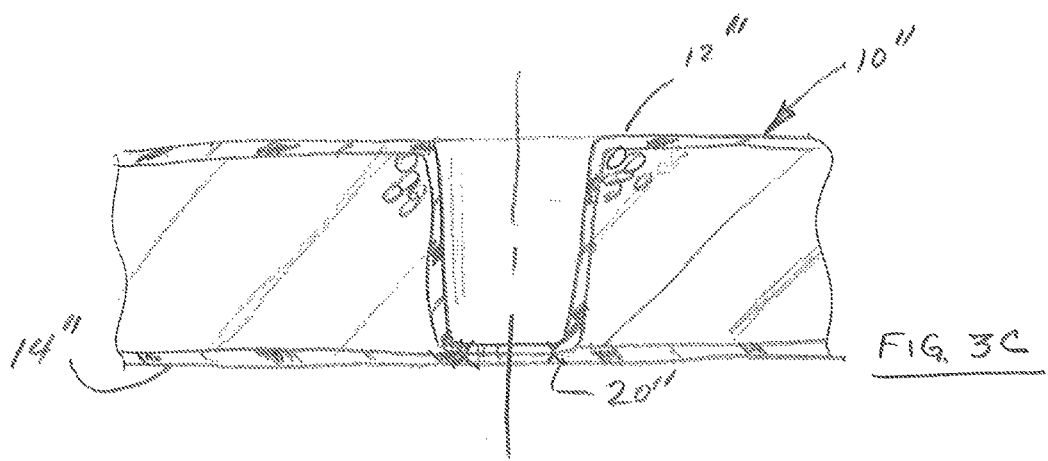
FIG. 3C schematically illustrates in a fragmentary cross-sectional view of another alternative stress mitigation component embodiment.

FIG. 3C is another variation 10" of the stress mitigation component 10 of FIG. 3A with junction 20" formed between a single embossment in one of skins 12" and the generally flat opposed skin 14". A single embossment is sufficient in in-situ foam core component applications where the thickness of the foam core relatively small e.g. one inch or less. However a pair of embossments is typically preferred to minimize thinning of the embossment wall.

In at least one embodiment of the method of forming the seat frame foot 30 is blow molding. Mold portions define a blow mold cavity into which a molten polypropylene parison is extruded from an extruder. The parison defines an internal parison cavity.

The blow mold portions close upon the parison. Gas is injected into the parison cavity inflating the hot parison while still soft and deformable to conform to the walls of the blow mold cavity defining the skins 12 and 14 having a cavity which may be larger than the original parison cavity. Sliding mold portions push on the parison to form the embossments 16 and 18 and junction 20.

Feed apertures are cut through skins 12 and 14. Staged filling begins as partially pre-expanded EPP beads are introduced to the cavity through an EPP introduction device fitted to the blow mold portions. At a first stage, EPP beads are introduced through the feed aperture. Filling at the next stages continues until the cavity is filled.

The EPP introduction device is withdrawn from the apertures. The apertures are plugged. Steam injection needles are inserted through blow mold portion and skins 12 and 14 into the filled cavity. A fluid for the second expansion step of the two-step expansion process for beads causes the pre-expanded beads to expand completely to form the fully expanded beads. Examples of the fluid include, but are not limited to, steam and superheated steam.

Steam is injected through steam injection needles into partially pre-expanded beads causing the beads to expand forming the in-situ foam core 22 in the area that was previously the cavity. The contacting layer of beads bond to skins 12 and 14 forming a thermal bond.

In at least one embodiment, in-situ foamed core 22 is formed by expanding a pre-expanded bead inside a blow molded shell. In at least one embodiment, pre-expanded bead is re-compressed by 10 vol. % to 70 vol. % when being dispersed. Upon being dispersed, pre-expand bead re-expands within the cavity.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An in-situ foam core component capable of attachment to a member using a through hole fastener, comprising:
    first and second opposed thermoformed skins each having a thermal bond to an in-situ foam core disposed therebetween, including a recessed first embossment on the first skin and an aligned recessed second embossment on the second skin, the first and second embossments being joined together at a welded pinch off junction;
    wherein a through hole is formed through the pinch off junction leaving an annular welded joint about the hole sized to receive a fastener there through so that the aligned first and second embossments provide a sleeve structure having an outer wall which is thermally bonded along its entire length to the in-situ foam core and can transmit load between the first and second skins when the in-situ foam core component is attached to a member using a fastener extending through the hole.

2. The in-situ foam core component of claim 1, wherein the aligned first and second embossments are generally cup shaped and each have outwardly tapered walls extending from a periphery of the annular welded joint to the outwardly spaced adjacent thermoformed skin providing die draft.

3. The in-situ foam core component of claim 2, wherein the aligned first and second embossments are generally circular in cross section.

4. The in-situ foam core component of claim 2, wherein the outwardly tapered walls are generally oriented 1 to 5 degrees from a central axis of the through hole.

5. The in-situ foam core component of claim 4, wherein region of thermoformed skins surrounding the first and second embossments are generally flat and perpendicular to the central axis of the through hole.

6. The in-situ foam core component of claim 1, wherein the component forms a seat component having a mounting portion in which the through hole in the pinch off junction is formed.

7. The in-situ foam core component of claim 6, wherein the seat component is a seat base frame, and the mounting portion is formed in a seat foot portion of the seat base frame.

8. The in-situ foam core component of claim 1, wherein the pinch off junction is provided with an annular frangible region sized to form the through hole when knocked out.

9. The in-situ foam core component of claim 1, wherein the thermoformed skins are comprised of polypropylene and have a thickness within a range of 0.025 to 0.1 inches.

10. The in-situ foam core component of claim 9, wherein the in-situ foam core is formed of expanded polypropylene and has a density ranging from 1 lb/ft$^3$ to 5 lbs/ft$^3$.

11. An in-situ foam core component capable of attachment to a member using a through hole fastener, comprising:
    first and second opposed thermoformed skins which are thermally welded directly to one another along a peripheral edge and at least one pinch off junction to define a cavity therebetween;
    an in-situ formed foam core formed with the cavity and thermally bonded to each of the thermoformed skins, and
    wherein, at least one embossment on the first skin is joined directly together with the second skin at the at least one pinch off junction without having the material forming the foam core located therebetween;
    wherein a through hole is formed in the at least one pinch off junction leaving an annular welded joint about the hole sized to receive a fastener so that the embossment provides a sleeve structure having an outer wall which is thermally bonded along its entire length to the in-situ foam core and can transmit load between the first and second skins when the in-situ foam core component is attached to a member using a fastener extending through the hole.

12. The in-situ foam core component of claim 11, wherein the embossment is generally cup shaped with an outwardly tapered wall extending from a periphery of the pinch off junction to the skin from which it is drawn.

13. The in-situ foam core component of claim 11, wherein the embossment is generally circular in cross section.

14. The in-situ foam core component of claim 11, wherein the outwardly tapered wall is generally oriented 1 to 5 degrees from a central axis of the through hole.

15. The in-situ foam core component of claim 14, wherein region of thermoformed skins surrounding the junction and the embossment are generally flat and perpendicular to the central axis of the through hole.

16. The in-situ foam core component of claim 11, wherein the in-situ foam core is formed of expanded polypropylene beads and the first and second opposed thermoformed skins are each formed of polypropylene.

17. The in-situ foam core component of claim 11, wherein one of the first and second thermoformed skin lacks an embossment and is generally flat in the region of the pinch off junction.

* * * * *